Figure 1:
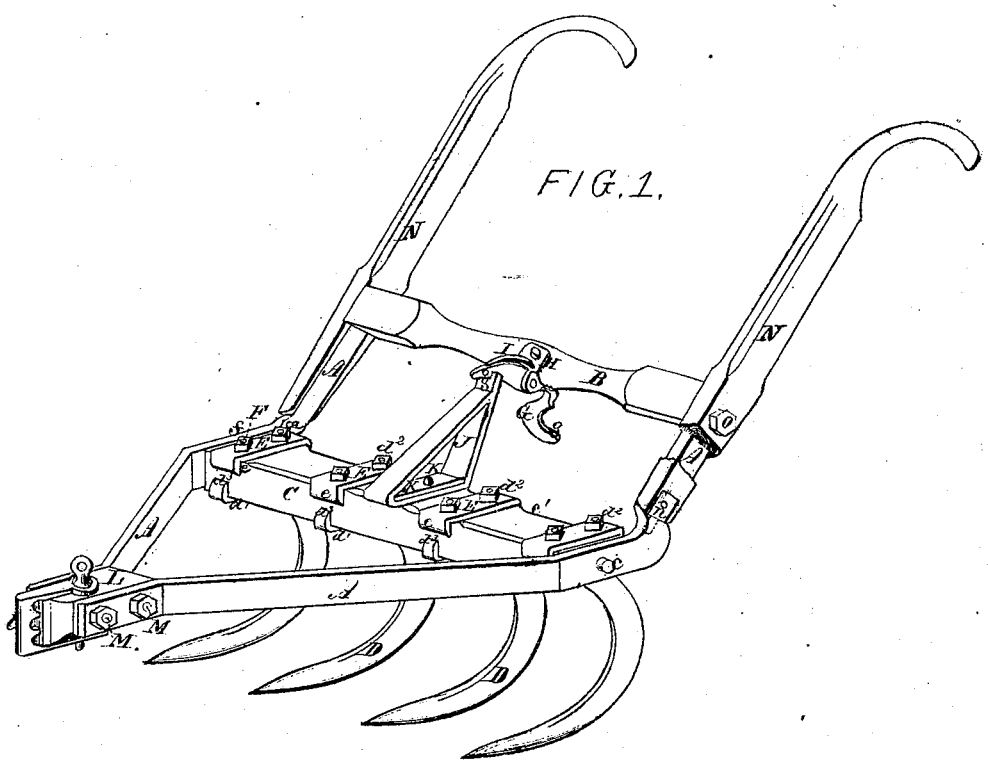

F. Villard.
Manure Fork.

No. 99,982.  2 Sheets, Sheet. 1.

Patented Feb. 15, 1870.

Witnesses
W. B. Deming
Fred M. Flautcke Jr.

Fred Villard
by Knight Bros
Attorneys

F. Villard,
Manure Fork.

No. 99,982.

Patented Feb. 15, 1870.

Witnesses
W. B. Deming
Fred. M. Klauckes

Fred. Villard
by Knight Bro.
Attorney

United States Patent Office.

FREDERICK VILLARD, OF MOUNT EATON, OHIO.

Letters Patent No. 99,982, dated February 15, 1870.

IMPROVED HAY AND MANURE-FORK

The Schedule referred to in these Letters Patent and making part of the same.

*To all whom it may concern:*

Be it known that I, FREDERICK VILLARD, of Mount Eaton, in the county of Wayne, and State of Ohio, have invented a new and useful Combined Hay and Manure-Fork; and that the following is a sufficiently full and exact description of the same to enable one skilled in the art to which my invention appertains to carry it into effect, reference being had to the accompanying drawings, which form part of this specification.

The subject of my invention is an implement of novel and simple construction, adapted to be readily converted for use either as a horse hay-fork or a manure-fork or scoop.

My improvements consist in a novel mode of attaching the teeth; the provision of removable handles to adapt the implement for use as a manure-fork or scoop; a novel construction of catch adapted for use in connection with different latches in both forms of the implement; and the peculiar construction and arrangement of the parts of the frame and the fork or scoop proper to adapt them for the different uses of the implement, as hereinafter more fully described.

In the drawings—

Figure 3:
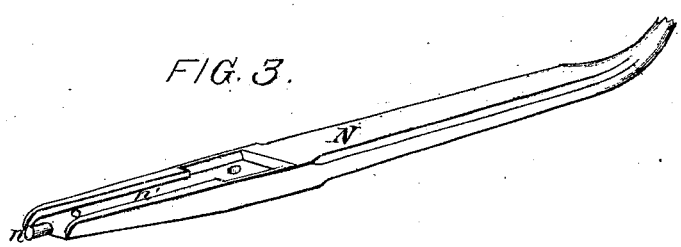
Figure 2:
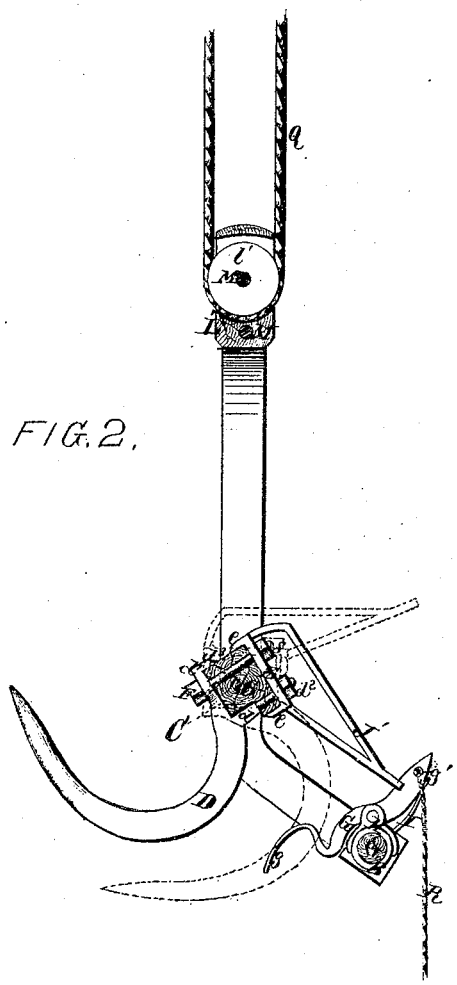
Figure 4:
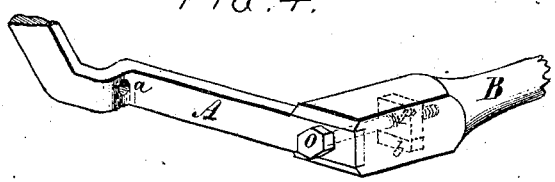

Figure 1 represents a perspective view of my improved implement adapted for use as a manure-fork or scoop;

Figure 2, a vertical longitudinal section of the same implement employed as a horse hay-fork, two positions of the parts being shown respectively in full and dotted lines;

Figure 3 is a detached perspective view of one of the removable handles of the implement; and Figure 4, a similar view of a portion of the frame of the implement, showing the adaptation for the attachment of the handles.

Similar letters of reference indicate like parts in the several figures.

A A represent the sides of the frame, which may consist of two similar flat wrought-iron bars, bent into substantially the form represented in figs. 1 and 3, and B, a cross-bar secured between the rear ends of the sides A A, and completing the frame.

C represents the cross-head, and

D D D, the tines or teeth of the fork or scoop proper, which may be of the common form shown, and mounted on pintles or trunnions $c$ between the sides A A of the frame in the usual manner, as represented.

The head C of the fork or scoop is constructed of an irregular rectangular form (represented in fig. 2) in cross-section, its major portion being square, or nearly so, and provided on its rear side, at its upper edge, with a longitudinal flange or abutment, $c'$.

The tines D are constructed for attachment to said head, with pairs of projections, $d\ d'$, at their upper ends, of substantially the form represented in fig. 2, adapted to grasp three sides of the head D at its lower edge, the latter abutting against the flange $c'$, and provided with threaded cylindrical extensions, passing through it and through plates or clips E on top of the head, where they are secured by nuts $d^2$.

Bolts F, passing through the projection $d$, the head, and the plates or clips E at the front edge of the head, and secured by nuts $f$, complete the attachment.

The projections $d^1$, lips $d^3$ on the projections $d$, and corresponding lips $e\ e$ on the plates or clips E, support the head laterally, and prevent splitting.

G represents a catch pivoted to the cross-bar B of the frame, and employed in connection with a latch projecting rigidly from the cross-head C of the fork or scoop to hold said fork or scoop in a proper position to engage with and support its load. It is connected with the cross-bar B by means of a suitable clip, H, as shown in figs. 1 and 2, pressed down by a spring, I, which may also project from said clip H, and provided with an arm or treadle, $g$, projecting rearwardly therefrom, to enable it, when the implement is employed as a manure-fork or scoop, as represented in fig. 1, to be elevated by the foot of the operator, and at its front end with a perforation, $g'$, for the attachment of a cord to elevate it, when the implement is employed as a horse hay-fork, as represented in fig. 2.

The implement, as above described, is unchanged in its different uses.

J J', figs. 1 and 2, represent removable latches, of different angles, respectively attached to the cross-head D of the fork or scoop by bolts K K, as the implement is employed as a manure-fork or scoop, as represented in fig. 1, or as a horse hay-fork, as represented in fig. 2, being respectively of substantially the forms represented, and adapted, by engagement with the spring-catch G, to hold the fork or scoop in a proper position for the purpose for which employed.

L L', figs. 1 and 2, represent removable blocks, respectively provided with a clevis, $l$, and a pulley, $l'$, and attached respectively between the front ends of the sides A A of the frame by bolts M M passing therethrough, as the implement is employed for one or the other purpose for which it is adapted, for the attachment to the implement of a whiffletree or an elevating rope respectively.

The front one of the bolts M also forms, as employed to attach the block L', the axis of its pulley $l'$.

N N, figs. 1 and 3, represent removable handles attached to the rear ends of the sides A A of the frame, when the implement is employed as a manure-fork or scoop, as represented in fig. 1. They are of the usual form for such handles, as shown, are secured by means of pins $n$ attached to their lower ends and entering corresponding sockets $a$ in said sides A, and bolts O passing through them and said sides into the ends of the cross-bar B, and are preferably adapted to be flush with the projecting portions of said sides by a depression of the ends thereof, and the provision of depressions or sockets, $n$, fig. 3, in their inner faces for the reception of said ends, as represented.

Nuts P, fig. 4, are let into the ends of the cross-bar B for the reception of the bolts O, and said bolts are adapted, on the removal of the handles N, to adapt the implement for use as a horse hay-fork, as represented in fig. 2, to be screwed in, so as to secure the sides A against said cross-bar, as shown in fig. 4, to secure said cross-bar in place.

The nuts P may be inserted through orifices formed in the side of the bar and closed by plugs $b$, as shown.

Q, fig. 2, represents the customary elevating rope, and

R, the trip-cord employed in connection with the implement when employed as a horse hay-fork, being applied respectively through the block L $l$, and to the catch G through the perforation $g'$ therein, as shown.

The operation of the implement in its different forms is usual, and will be readily understood.

To convert the implement from a manure-fork or scoop, as represented in fig. 1, to a horse hay-fork, as represented in fig. 2, the bolts B, holding the handles N, are withdrawn, said handles removed, and the bolts returned to their places and screwed up against the sides A; the bolts M M, securing the block L $l$, are withdrawn, said block removed, L', with its pulley $l'$, substituted therefor, and said bolts returned to their places; and the bolts K K, attaching the catch J to the cross-bar B, are partially withdrawn, said catch removed, and J' substituted therefor, and secured by said bolts, when, the rope Q being passed through the block L' under the pulley $l'$, and the trip-cord R attached to the latch G by means of the perforation $g'$, the implement is ready for use in said form.

To convert it from a horse hay-fork to a manure-fork or scoop, the operation is the same, the parts substituted in the former case being removed and those removed applied.

The precise details of construction and arrangement may be obviously varied without departing from the invention.

Having thus described my invention,

I claim, and desire to secure by Letters Patent—

1. In combination with the cross-head C and tines D of the fork or scoop, the flange or abutment $c'$, projections $d$ $d^1$, plates E, bolts F, and nuts $d^2$ $f$, forming the fastening of said tines, substantially as shown and described.

2. The combination in the catch G of a combined hay and manure-fork, constructed substantially as herein shown and described, of a perforation, $g'$, for the attachment of a trip-cord, and a treadle, $g$, through which to operate it in the respective uses of the implement, as herein set forth.

3. The frame A, as constructed of the form represented, and provided with the sockets $a$ and bolts O, arranged as shown and described, to adapt it for the reception of removable handles, as set forth.

4. The handles N, as constructed with the axial pins $n$, perforations for the reception of attaching bolts O, and cavities $n'$, formed and arranged as set forth, to adapt them for attachment.

5. In combination with the frame A B, fork or scoop C D, and opening catch G $g$ $g'$, the removable latch J, removable clevis-block L $l$, and removable handles N N, substantially as shown and described, for the purpose set forth.

6. In combination with the frame A B, fork or scoop C D, and spring-catch G $g$ $g'$, the removable latch J' and removable pulley-block L' $l'$, substantially as shown and described, for the purpose set forth.

FREDERICK VILLARD.

Witnesses:
GEORGE REX,
J. H. CARR.